United States Patent [19]

Kaufmann

[11] 4,371,819
[45] Feb. 1, 1983

[54] PULSE WIDTH MODULATION SPEED CONTROL

[75] Inventor: Kenneth M. Kaufmann, Minneapolis, Minn.

[73] Assignee: Pako Corporation, Minneapolis, Minn.

[21] Appl. No.: 215,441

[22] Filed: Dec. 11, 1980

[51] Int. Cl.³ .............................................. H02P 5/06
[52] U.S. Cl. .................................. 318/341; 318/318; 318/327; 318/329; 318/345 E
[58] Field of Search .............. 318/341, 309, 310, 311, 318/312, 318, 327, 329, 345 R, 345 A, 345 E

[56] References Cited

U.S. PATENT DOCUMENTS

| | | | |
|---|---|---|---|
| 4,066,941 | 1/1978 | Foster | 318/341 |
| 4,078,192 | 3/1978 | Fultz | 318/341 X |
| 4,153,863 | 5/1979 | Schachte et al. | 318/341 |
| 4,258,300 | 3/1981 | Fromont | 318/341 X |
| 4,260,936 | 4/1981 | Sun | 318/341 X |
| 4,278,924 | 7/1981 | Mawatari et al. | 318/318 X |
| 4,280,082 | 7/1981 | Acharya et al. | 318/341 |
| 4,298,832 | 11/1981 | Acker et al. | 318/341 X |

OTHER PUBLICATIONS

"Microprocessor-Based Controller", by Y. T. Chan et al., IEEE vol. IECI-27, No. 3, Aug. 1980, pp. 169-176.

Primary Examiner—J. V. Truhe
Assistant Examiner—Richard M. Moose
Attorney, Agent, or Firm—Kinney, Lange, Braddock, Westman and Fairbairn

[57] ABSTRACT

A pulse width modulation (PWM) speed control for a DC electric motor includes an encoder for providing encoder pulses in reponse to incremental rotation of a shaft driven by the motor. A timer senses a time period between encoder pulses. After three consecutive sensed time periods, a microcomputer compares the sensed time periods with a desired time period corresponding to a desired motor speed, and provides a digital value which is a function of the comparison of the sensed and desired time periods. The ditigal value is supplied to a timer, which applies an energizing pulse to the DC motor for an interval which is a function of the digital value.

5 Claims, 2 Drawing Figures

PULSE WIDTH MODULATION SPEED CONTROL

BACKGROUND OF THE INVENTION

1. Field of the Invention

The present invention relates to a speed control for an electric motor. In particular, the present invention relates to a pulse width modulation speed control for a DC electric motor.

2. Description of the Prior Art

Pulse width modulation is a technique which has been used in a variety of fields, including communications and electrical controls. Pulse width modulation may be used to power DC motors by using a pulse train instead of a variable DC voltage level to control motor speed. The width of the pulses of the pulse train correspond to the time it takes for the motor to attain a specific velocity while applying a full amplitude DC voltage, while never allowing the motor to attain full speed as defined by a continuous DC voltage signal. This method provides full voltage-like torque without full speed and also eliminates the hunting associated with motor startup which occurs with variable voltage speed control of DC motors.

SUMMARY OF THE INVENTION

The present invention is an improved speed control for DC electric motors which utilizes pulse width modulation. In the control of the present invention, encoder means provide encoder pulses in response to incremental rotation of a shaft which is driven by the DC electric motor. A time period between selected encoder pulses is sensed and compared to a desired time period which represents a desired motor speed. Based upon this comparison, a digital value is provided. The DC electric motor is then energized for a time interval which is a function of the digital value.

In preferred embodiments of the present invention, the speed control of the present invention takes advantage of the data storage and computational capabilities of a digital computer, such as a microcomputer. The computer stores the desired time period, compares the sensed and desired time periods, and provides the digital value which is a function of the comparison of the sensed and desired time periods. This preferred embodiment provides great flexibility in the control of the DC motor, and provides a low-cost, yet effective speed control system.

DETAILED DESCRIPTION OF THE PREFERRED EMBODIMENTS

Figure 1:
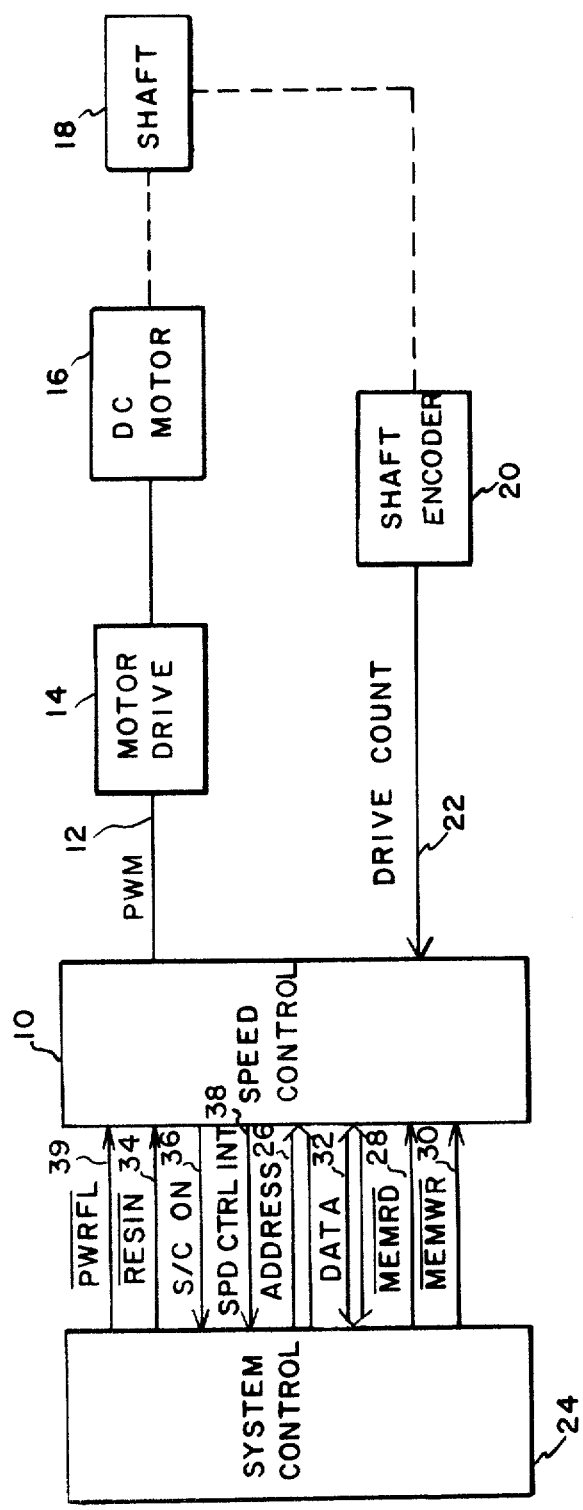
FIG. 1 is an electrical block diagram showing an electrical control system which utilizes the speed control of the present invention.

In the block diagram shown in FIG. 1, speed control 10 of the present invention supplies a pulse width modulation (PWM) signal on line 12 to motor drive 14, which energizes DC motor 16. The energization supplied by motor drive 14 to DC motor 16 is a full amplitude DC voltage which has a duty cycle determined by the PWM signal on line 12.

DC motor 16 drives shaft 18. Shaft encoder 20 supplies encoder pulses on DRIVE COUNT line 22. Each encoder pulse represents an incremental movement of shaft 18. In one preferred embodiment of the present invention, shaft encoder 20 includes a vaned wheel mounted on shaft 18 and a Hall effect sensor. The Hall effect sensor detects the presence of the metallic vanes of the wheel in a magnetic field as the wheel rotates with shaft 18.

Speed control 10 of the present invention controls the duty cycle of the PWM signal on line 12 based upon stored information and the encoder pulses from shaft encoder 20. In a preferred embodiment of the present invention, speed control 10 measures time periods between consecutive encoder pulses. After three consecutive time periods, speed control 10 determines whether all three time periods are within a predetermined range of one another, thus indicating that the speed of DC motor 10 has stabilized. If all three pulses are within the predetermined range, speed control 10 then compares the average of the three sensed time periods with a desired time period which has been stored. This desired time period corresponds to the desired speed of DC motor 16. Based upon this comparison, speed control 10 shortens or lengthens the duty cycle of the PWM signal or leaves the duty cycle as is.

If all three sensed time periods are not within the predetermined range, speed control 10 does not alter the duty cycle of the PWM signal. Instead, speed control 10 waits for the next three consecutive time periods to be sensed, and again determines whether all three time periods fall within the predetermined range of one another. If speed control 10 has monitored a predetermined number of groups of three consecutive time periods without finding any group in which all three time periods fall within the predetermined range of one another, speed control 10 monitors longer time periods, such as the time period between encoder pulses which represent a complete revolution of shaft encoder 20. In the event that the fluctuation in sensed time periods was due to irregularities in shaft encoder 20, speed control 10 is able to compensate for the irregularities by using longer time periods. The modification of the PWM signal by speed control 10 is achieved in a similar manner by comparing sensed and desired time periods.

Speed control 10 of the present invention may be operated independently, or as part of a larger control system. FIG. 1 illustrates a preferred embodiment of the present invention in which system control 24 communicates with speed control 10 to supply motor control information, and to receive the information from speed control 10 as to the operating speed of DC motor 16.

In the preferred embodiments shown in FIG. 1, system control 24 and speed control 10 each preferably include a digital computer, such as a microcomputer. System control 24 addresses speed control 10 through address bus 26. The MEMRD and MEMWR control lines 28 and 30 permit system control 24 to determine whether data is sent to speed control 10 on data bus 32, or whether data is received from speed control 10. RESIN line 34 is a control line from system control 24 to speed control 10 which permits system control 24 to reset the circuitry of speed control 10.

Control lines 36 and 38 provide signals from speed control 10 to system control 24. The S/C ON line 36 provides a signal from speed control 10 to system control 24 indicating that speed control 10 is turned on and is in operation. SPD CTRL INT line 38 is an interrupt line by which speed control 10 informs system control 24 that information as to the operating speed of motor 16 is available for transfer to system control 24.

Figure 2:
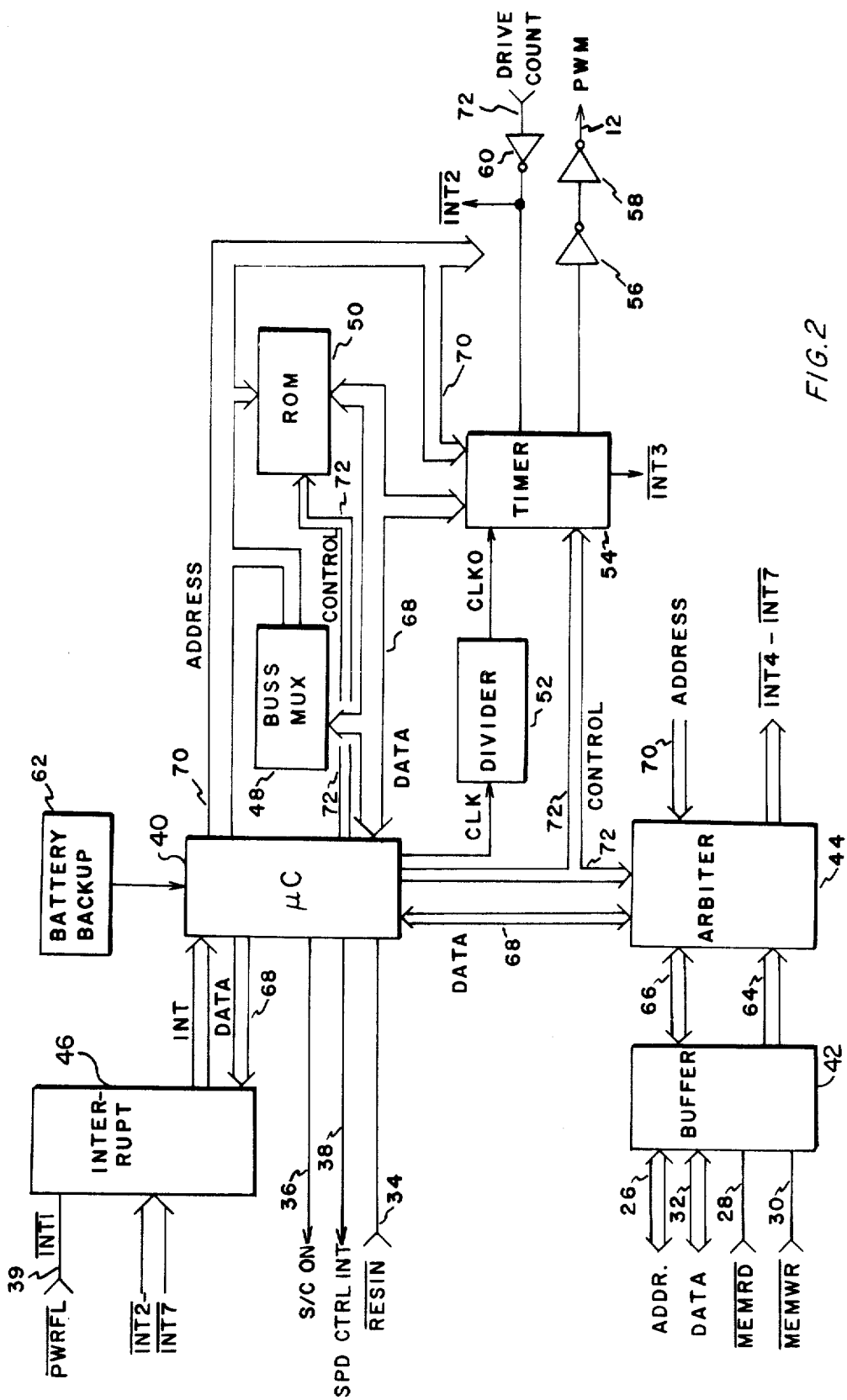
FIG. 2 is an electrical block diagram showing a preferred embodiment of the speed control of the present invention.

FIG. 2 is an electrical block diagram showing a preferred embodiment of speed control 10 of the present invention. Speed control 10 includes microcomputer 40, buffer circuit 42, arbiter circuit 44, interrupt circuit 46, bus multiplexer 48, read only memory (ROM) 50, divider 52, timer 54, buffers 56, 58 and 60, and battery backup circuit 62.

Transmission of data between system control 24 and speed control 10 is provided through buffer circuit 42 and arbiter 44. When system control 24 is transferring information to speed control 10, such as a new speed control set point for DC motor 36, an address is supplied on address bus 26, data is supplied on data bus 32, and the MEMWR line 30 indicates that system control 24 is supplying data to speed control 10. Buffer 42 supplies control signals to arbiter 44 on control lines 64, and supplies the data to arbiter 44 on data bus 66. Arbiter 44 supplies interrupt signals on interrupt lines INT-4–INT7 to interrupt circuit 44, which in turn supplies interrupt signals on lines 68 to microcomputer 40. The data received by arbiter 44 from buffer 42 is transferred to microcomputer 40 on data bus 68. The speed control information received from system control 24 is stored by microcomputer 40, and is used to control the duty cycle of the PWM signal on line 12.

When information is to be supplied from speed control 10 to system control 24, such as current speed information, microcomputer 40 supplies address signals on address bus 70, control signals on control lines 72, and data on data bus 68 to arbiter 44. Microcomputer 40 also supplies a signal on speed control interrupt line 38 to system control 24, indicating that information is ready to be transferred. System control 20 then supplies a signal on MEMRD line 28 to buffer 42, and the data is transferred from arbiter 44 through data bus 66 to buffer 42, and from buffer 42 through data bus 32 to system control 24.

During normal operation, speed control 10 supplies the PWM signal on line 12 to motor drive 14, which energizes motor 60. In the embodiment shown in FIG. 2, microcomputer 40 controls the duty cycle of the PWM signal through divider 52 and timer 54. Microcomputer 40 loads a numerical value into timer 54, and timer 54 counts down to zero in response to a CLKO clock signal supplied by divider 52. In the embodiment shown in FIG. 1, the CLKO signal is a lower frequency clock signal provided by divider 52 from a CLK signal supplied by an internal clock (not shown) of microcomputer 40. The output of timer 54 goes high when loaded by microcomputer 40 and continues high until the count reaches zero. At this point, the PWM signal goes low. It can be seen, therefore, that the numerical value loaded by microcomputer 40 into timer 54 determines the duty cycle of the PWM signal.

Microcomputer 40 determines the numerical value loaded into timer 54 as a function of stored speed control information and the time period between encoder pulses on line 22. As illustrated in FIG. 2, encoder pulses from shaft encoder 70 are received on line 22 and are buffered by buffer 60. Timer 54 and interrupt circuit 46 each receive the encoder pulses.

Timer circuit 54 not only supplies the PWM signal, but also provides a numerical count indicating the time period between consecutive encoder pulses. Upon the receipt of each encoder pulse, interrupt circuit 46 supplies an interrupt signal to microcomputer 40. The count in timer 54 indicative of the just-completed time period between encoder pulses is transferred from timer 54 to microcomputer 40 on data bus 68, and timer 54 begins counting the next time period between encoder pulses.

After three consecutive time periods have been measured, microcomputer 40 compares these three time periods to a desired time period which corresponds to a desired speed of DC motor 16. Depending upon this comparison, microcomputer 40 either increases, decreases or leaves as is the numerical value to be loaded into timer 54 for the next cycle of the PWM signal.

In a preferred embodiment of the present invention, microcomputer 40 compares the measured and desired time periods in the following manner. First, microcomputer 40 compares the three measured time periods to determine whether they are the same to within a predetermined range of one another. If the three periods differ by greater than the predetermined amount, it indicates that the motor speed is not yet stabilized, and microcomputer 40 does not change the numerical value to be loaded into timer 54.

When the motor speed has stabilized, so that the three measured time periods are the same to within a predetermined percentage range (which in one preferred embodiment is ±0.05%), microcomputer 40 then compares the average of the three measured periods to the desired time period. Based upon the deviation between the measured and desired time periods, microcomputer 40 either (a) increases the numerical value (thus lengthening the PWM "on time" and increasing motor speed); (b) reduces the numerical value (thus shortenging the PWM "on time" and reducing motor speed); or (c) leaves the numerical value unchanged, (thus leaving the motor speed unchanged).

In addition to providing a feedback control of motor speed, the time periods between encoder pulses provide an indication of motor speed which can be outputted by microcomputer 40 through arbiter 44 and buffer 42 to system control 24.

In conclusion, the speed control of the present invention provides pulse width modulation speed control of a DC electric motor. The speed control of the present invention takes advantage of the data storage and computational capabilities of microcomputer 40 to adjust the duty cycle of the PWM signal so that the time period between encoder pulses corresponds to a desired time period. The digital nature of the speed control of the present invention makes it particularly well adapted for use in conjunction with larger digital systems, and provides the capability of greater accuracy than is possible with analog systems.

Although the present invention has been described with reference to preferred embodiments, workers skilled in the art will recognize that changes may be made in form and detail without departing from the spirit and scope of the invention.

What is claimed is:

1. A drive system comprising:
   a DC electric motor;
   a drive shaft driven by the DC electric motor;
   encoder means for providing encoder pulses in response to incremental rotation of the drive shaft;
   means for sensing time periods between selected encoder pulses and providing first digital values representative of the sensed time periods;

means for storing a second digital value representative of a desired time period corresponding to a desired speed;

means for comparing sensed and desired time periods and providing a third digital value which is a function of the comparison of the sensed and desired time periods; wherein the means for comparing compares the second digital value representative of the desired time period with an average of a plurality of first digital values representative of consecutive sensed time periods; and wherein the means for comparing compares the plurality of first digital values representative of consecutive sensed time periods with one another and permits a change in the third digital value only if the first digital values representative of consecutive sensed time periods are within a predetermined range of one another; and means for energizing the DC electric motor for a time interval which is a function of the third digital value.

2. A speed control system for controlling speed of a DC electric motor which drives a drive shaft, the speed control system comprising:

means for providing a variable duty cycle pulse width modulation drive signal to the DC electric motor;

encoder means for providing encoder pulses in response to incremental rotation of the drive shaft;

means for sensing time periods between selected encoder pulses and providing first digital values representative of the sensed time periods;

means for storing a second digital value representative of a desired time period corresponding to a desired speed of the drive shaft; and means for controlling the duty cycle of the pulse width modulation drive signal as a function of the sensed and desired time periods; wherein the means for controlling the duty cycle compares the second digital value representative of the desired time period with an average of a plurality of first digital values representative of consecutive sensed time periods, and adjusts the duty cycle of the pulse width modulation drive signal as a function of the comparison; and wherein the means for controlling the duty cycle compares the plurality of first digital values representative of consecutive sensed time periods with one another and adjusts the duty cycle only if the first digital values representative of consecutive sensed time periods are within a predetermined range of one another.

3. The speed control system of claim 2 wherein the means for controlling the duty cycle comprises a digital computer.

4. The speed control system of claim 3 wherein the means for sensing time periods comprises:

interrupt means for providing interrupt signals to the digital computer indicative of the occurrence of each encoder pulse; and means for providing a digital count indicative of the sensed time period between selected encoder pulses.

5. The speed control system of claim 4 wherein the means for providing a digital count comprises:

clock means for providing clock pulses; and timer means for counting in response to the clock pulses during a time period between selected encoder pulses.

* * * * *